C. E. MEIGHAN.
BALL BEARING, ROTARY VENTILATOR RING.
APPLICATION FILED FEB. 28, 1913.

1,084,464.

Patented Jan. 13, 1914.

Witnesses:
John H. Selfridge
Clarence L. Gordon

Inventor:
Charles E. Meighan

UNITED STATES PATENT OFFICE.

CHARLES E. MEIGHAN, OF REVERE, MASSACHUSETTS.

BALL-BEARING, ROTARY-VENTILATOR RING.

1,084,464.  Specification of Letters Patent.  Patented Jan. 13, 1914.

Application filed February 28, 1913. Serial No. 751,357.

*To all whom it may concern:*

Be it known that I, CHARLES E. MEIGHAN, a citizen of the United States, residing at 96 Florence avenue, Revere, in the county of Suffolk and State of Massachusetts, have invented a new and useful Ball - Bearing, Rotary-Ventilator Ring, of which the following is a specification.

My invention relates to improvements in rotary ventilator ball-bearing rings in which metal rings operate in conjunction with steel balls; and the objects of my improvements are, first, to provide a practically tight joint between the ventilation pipe and the ventilator head, and thereby increase the exhaust power of the ventilator; second, to give a free and unobstructed air passage through ventilator; and third, to reduce friction and noise incidental thereto. I attain these objects by the mechanism illustrated in the accompanying drawing, in which—

Figure 1:
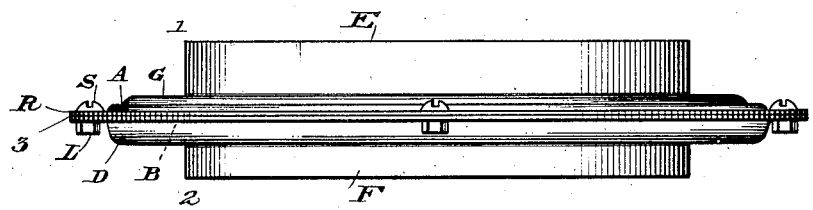
Figure 2:
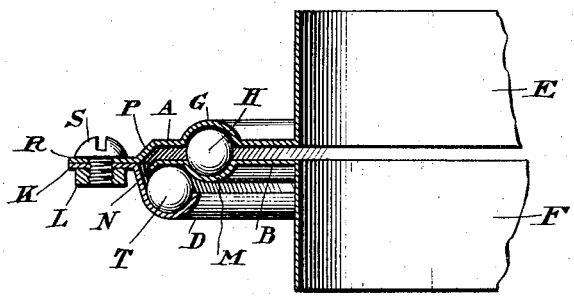

Figure 1 is an elevation of the entire ring; Fig. 2 a detail cross section through the points 1, 2, 3, Fig. 1.

Similar letters refer to similar parts throughout the two views.

The ring A with its annular groove or ball-race G, its perpendicular flange E on the inner circumference, and offset P and flange R on its outer circumference, constitutes the upper section of ring. The ring B with its annular groove or ball-cup M, its ball race N, and its downward flange F constitutes the lower section of the ring. The ring K, with its ball-cup D, secured to flange R of ring A by bolts S and nuts L, serves to fasten the rings A and B together and retain the balls H and T in their respective channels. The flange E on the ring A is of sufficient length to be firmly secured to the rotary ventilator head with bolts or rivets. The flange F on the ring B is of sufficient length to be firmly secured to the ventilation pipe with bolts or rivets.

I am not aware that prior to my invention, ball-bearing ventilator rings have been made.

I therefore claim:

The combination of a ball-bearing ring, having a ball-race in its lower surface, a flanged edge on its inner circumference and an offset and flange on its outer circumference, coöperating with a ring having a ball-cup with balls therein, a flanged edge on its inner circumference and a ball-race on its outer circumference, in conjunction with a retaining ring having a ball-cup with balls therein, and secured to the flange on the outer circumference of first mentioned ring with bolts substantially as set forth.

CHARLES E. MEIGHAN.

Witnesses:
JOHN H. SELFRIDGE,
CLARENCE D. GORDON.